United States Patent
Teshome et al.

(10) Patent No.: US 11,438,347 B2
(45) Date of Patent: *Sep. 6, 2022

(54) INFORMATION HANDLING SYSTEM THREAT MANAGEMENT AND DETECTION WITH SCHEDULED TOKEN COMMUNICATION

(71) Applicant: Dell Products L.P., Round Rock, TX (US)

(72) Inventors: Abeye Teshome, Austin, TX (US); Srinivas Kamepalli, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/816,462

(22) Filed: Mar. 12, 2020

(65) Prior Publication Data
US 2020/0220883 A1 Jul. 9, 2020

Related U.S. Application Data

(63) Continuation of application No. 15/964,384, filed on Apr. 27, 2018, now Pat. No. 10,637,876.

(51) Int. Cl.
*G06F 16/951* (2019.01)
*H04L 9/40* (2022.01)

(52) U.S. Cl.
CPC ........ *H04L 63/1416* (2013.01); *G06F 16/951* (2019.01); *H04L 63/0209* (2013.01); *H04L 63/0853* (2013.01)

(58) Field of Classification Search
CPC ......... H04W 12/00502; H04L 63/1416; H04L 63/0209; H04L 63/0853; G06F 16/951
USPC .............................................................. 726/9
See application file for complete search history.

(56) References Cited

U.S. PATENT DOCUMENTS

| | | | |
|---|---|---|---|
| 6,321,344 B1 * | 11/2001 | Fenchel | G06F 11/0757 710/107 |
| 6,480,473 B1 * | 11/2002 | Chambers | H04L 41/00 370/253 |
| 7,613,205 B1 * | 11/2009 | Chen | H04L 63/1416 370/450 |
| 8,307,442 B2 | 11/2012 | Asati et al. | |
| 8,352,079 B2 | 1/2013 | Wendt | |
| 8,522,335 B2 | 8/2013 | Lawrence et al. | |
| 8,924,577 B2 | 12/2014 | Choe | |
| 9,578,033 B2 | 2/2017 | Matthieu et al. | |
| 9,667,635 B2 | 5/2017 | Byers et al. | |
| 9,692,784 B1 | 6/2017 | Nenov | |
| 9,781,696 B1 | 10/2017 | Soave | |
| 10,089,610 B2 | 10/2018 | Chow | |
| 10,250,623 B1 | 4/2019 | Patton | |

(Continued)

*Primary Examiner* — Bryan F Wright
(74) *Attorney, Agent, or Firm* — Zagorin Cave LLP; Robert W. Holland

(57) ABSTRACT

Plural Internet of Things (IoT) gateways detect, secure against and remediate malicious code with an autonomous communication of tokens between the IoT gateways on a time schedule. Detection of an invalid token or a token communication outside of a scheduled time indicates that malicious code may have interfered with token generation or communication. Verification of a token communication to an IoT gateway that failed in turn to pass the token to another IoT gateway indicates that the IoT gateway is a threat that may include malicious code.

5 Claims, 10 Drawing Sheets

(56) References Cited

U.S. PATENT DOCUMENTS

| | | |
|---|---|---|
| 10,268,844 B2 | 4/2019 | Gulati |
| 10,382,213 B1 | 8/2019 | Rafn et al. |
| 10,382,480 B2 | 8/2019 | Reddy |
| 10,447,554 B2 | 10/2019 | Gupta |
| 10,499,246 B2 | 12/2019 | Li |
| 2004/0088564 A1 | 5/2004 | Norman |
| 2014/0089503 A1* | 3/2014 | Thyni ................. H04L 61/1511 709/224 |
| 2016/0350519 A1 | 12/2016 | Pattyn |
| 2017/0005515 A1 | 1/2017 | Sanders |
| 2017/0006065 A1 | 1/2017 | Kamble et al. |
| 2017/0006141 A1 | 1/2017 | Bhadra |
| 2017/0126569 A1 | 5/2017 | Seed |
| 2017/0346677 A1 | 11/2017 | Suryanarayana |
| 2018/0007082 A1 | 1/2018 | Ha |
| 2018/0034831 A1 | 2/2018 | Zhang |
| 2018/0089014 A1* | 3/2018 | Smith ................. H04L 43/0805 |
| 2018/0091506 A1 | 3/2018 | Chow |
| 2018/0091526 A1 | 3/2018 | Cammarota |
| 2018/0234302 A1 | 8/2018 | James et al. |
| 2018/0270064 A1 | 9/2018 | Gehrmann |
| 2018/0285180 A1 | 10/2018 | Teshome et al. |
| 2018/0317266 A1* | 11/2018 | Britt ................. H04W 12/0433 |
| 2018/0351793 A1 | 12/2018 | Hunter et al. |
| 2018/0375889 A1 | 12/2018 | Dickenson et al. |
| 2019/0021004 A1 | 1/2019 | Shanmugavadivel |
| 2019/0215688 A1 | 7/2019 | Zavesky |
| 2019/0238567 A1 | 8/2019 | Sharma |
| 2019/0245894 A1 | 8/2019 | Epple |
| 2019/0260769 A1 | 8/2019 | Sharon et al. |
| 2019/0319950 A1 | 10/2019 | Bowling |
| 2020/0374205 A1 | 11/2020 | Sharma et al. |

* cited by examiner

INFORMATION HANDLING SYSTEM THREAT MANAGEMENT AND DETECTION WITH SCHEDULED TOKEN COMMUNICATION

CROSS REFERENCE TO RELATED APPLICATION

Continuing Data

This application is a continuation of co-pending application Ser. No. 15/964,384, filed Apr. 27, 2018, entitled "Information Handling System Threat Management," which is incorporated by reference in its entirety.

U.S. patent application Ser. No. 15/964,384, filed Apr. 27, 2018, entitled "Information Handling System Threat Management" by inventors Abeye Teshome and Srinivas Kamepalli, describes exemplary methods and systems and is incorporated by reference in its entirety.

U.S. patent application Ser. No. 15/964,406, filed Apr. 27, 2018, entitled "Information Handling System Threat Management" by inventors Abeye Teshome and Srinivas Kamepalli, describes exemplary methods and systems and is incorporated by reference in its entirety.

U.S. patent application Ser. No. 15/964,445, filed Apr. 27, 2018, entitled "Information Handling System Threat Management" by inventors Abeye Teshome and Srinivas Kamepalli, describes exemplary methods and systems and is incorporated by reference in its entirety.

BACKGROUND OF THE INVENTION

Field of the Invention

The present invention relates in general to the information handling system network device management, and more particularly to information handling system threat management.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Low power processors and sensors have spawned information handling systems that support the Internet of Things (IoT), which generally refers to a network of physical devices that exchange data. IoT devices typically include sensors that monitor the conditions at a physical device, such as temperature, accelerations, current, power consumption, pressure, orientations, etc. . . . . Some "gateway" IoT devices include communications that directly interact with the Internet, such as an integrated wireless networking interface card (WNIC) that supports WiFi or cellular telephone WWAN communications. Other "sensor" IoT devices include more limited communications to report sensed conditions, such as a Bluetooth or Bluetooth Low Energy transceiver typically running as a system on chip (SOC). Generally, sensor IoT devices that do not have direct Internet interfaces communicate data to the Internet through gateway IoT devices that include Internet interfaces. Sensor IoT devices tend to perform monitoring functions that use minimal power and report sensed conditions intermittently. Gateway IoT devices also run with minimal power consumption although listening for sensor IoT devices and maintaining an Internet interface do tend to increase power consumption somewhat relative to sensor IoT devices.

Generally, IoT devices run unmonitored and "headless," meaning without a display. As an example, IoT devices are distributed through a manufacturing location to monitor machinery and detect potential failures. Sensor IoT devices might, for instance, monitor a motor's temperature, vibrations and current draw. The sensor IoT reports information captured by its sensors to a gateway IoT device, which in turn reports the information to a server, typically in a network cloud. When sensed information detects unusual operating conditions, an alert issues from the cloud so that maintenance can be directed towards the faulty equipment. In a manufacturing location, gateway IoT devices are often distributed among sensor IoT devices so that multiple gateways are available to support sensor Internet communications. As an example, a mesh network deployed across a manufacturing location between gateway IoT devices provides flexible network access and reliable interfaces. Generally IoT devices support remote updates so that monitoring functions performed on a device can be updated without physically interacting with a device. For example, updated executable code is downloaded through the Internet to flash memory of the device, which is then restarted to boot to the updated code.

One difficulty with IoT devices is that their unattended and headless operating modes open a wide attack surface for malicious code, such as DDoS, Portsweep, Spoofing, Man-in-the-Middle, etc. For example, a malicious actor can download malicious code through the Internet to an IoT device that hijacks the IoT device for malicious purposes. Once malicious code is established in an IoT mesh network, the malicious code can rapidly spread to other IoT devices so that sensed information becomes unreliable and even intentionally corrupt, resulting in disruption of operations monitored by the IoT devices. Various safeguards exist to protect against malicious code, such as secure pins to protect against downloads of malicious code and encrypted updates that restrict execution of firmware updates, however, once malicious code is established at a node in a network, the malicious code can spread aggressively. The longer a corrupted node exists in an IoT mesh network, the more likely that the malicious code will spread to other devices and disrupt operations.

SUMMARY OF THE INVENTION

Therefore, a need has arisen for a system and method which detects, protects against and remediates malicious code in an IoT network.

In accordance with the present invention, a system and method are provided which substantially reduce the disadvantages and problems associated with previous methods and systems for managing malicious code threats in an IoT network. IoT devices communicating through an in band network interface organize as one or more populations that exchange a token according to a schedule. Failure of an IoT network node, such as a gateway or sensor IoT device, to communicate or receive a token having a valid value at an expected time initiates threat detection to determine if a failed IoT device has malicious code. An IoT device identified as a threat is isolated, quarantined and remediated, such as by re-imaging an application on the failed device through an out of band network interface.

More specifically, plural Internet of Things (IoT) devices interface through an in band network, such as wireless network, to perform functions, such as provide Internet interactions for sensor IoT devices. For example a gateway IoT device integrates a processor, flash memory, random access memory and network interface, such as with a system on chip architecture. A timer monitors an application running on the processor to detect indications of malicious code so that the IoT device can rapidly and autonomously take corrective action. For example, a token communication schedule defines token values and communication times between IoT nodes of a defined population. The timer checks that the IoT device successfully communicated and received the tokens according to the schedule, such by reading a flag set in memory or EEPROM. Failure to communicate a token successfully can indicate that the node itself has failed or that the near node that is a target of the token has failed. Failure to receive a token successfully can indicate that the node itself as failed or that the near node scheduled to send the token has failed. A cross check with near nodes confirms that failed device so that the failed device can be isolated from the population and quarantined from the token exchange schedule. Once a failed device is isolated to reduce any impact on near peers, the functions supported by the failed device may be reassigned to operational devices of the population. Remediation of the failed device may then be performed with an out of band communication, such as from a server information handling system, or an in band communication, such as from near peer.

The present invention provides a number of important technical advantages. One example of an important technical advantage is that headless and remote IoT devices autonomously organize populations to monitor for malicious code threats by passing a token among the population with reference to a token communication schedule. Multiple attack surfaces are monitored so that, if malicious code is detected by failure of token communication, the failed node is quickly identified to minimize the impact of the malicious code. Threat detection is provided through multiple avenues including near peer monitoring of token values and communication, self-monitoring of token communications and out of band interfaces when monitoring indicates a failed device. Autonomous threat detection allows dynamic and autonomous resolution and restoration of functions at a network during an active attack.

Another important technical advantage is autonomous, self-describing and deterministic marshalling of an IoT population to provide real time protection of the population from malicious code and other threats. Unassisted and real time planning and transferring of available capabilities across a population of IoT devices allows rapid adjustments to manage device depletion from implementation of malicious code, such as by reassigning functionality related to failed nodes. Self-detection of device failure by monitoring scheduled token communications allows a rapid corrective action to prevent damage once malicious code is executing on a device. The type and nature of the failure can be remotely determined and analyzed to effect responses at devices that face a similar failure. Sensor IoT devices and end devices are protected with adaptive defaults initiated upon detection of a threat to minimize the impact of malicious code and to allow takeover of assigned functions related to the sensors with near nodes of the failed node. Remediation is accomplished by placing a failed node in a protected boot state so that only authorized devices may re-image the device application, such as through an out of band network interface or from a near peer with an in band communication.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

Information handling systems configured as Internet of Things (IoT) devices autonomously detect threats to isolate and remediate corrupt devices. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
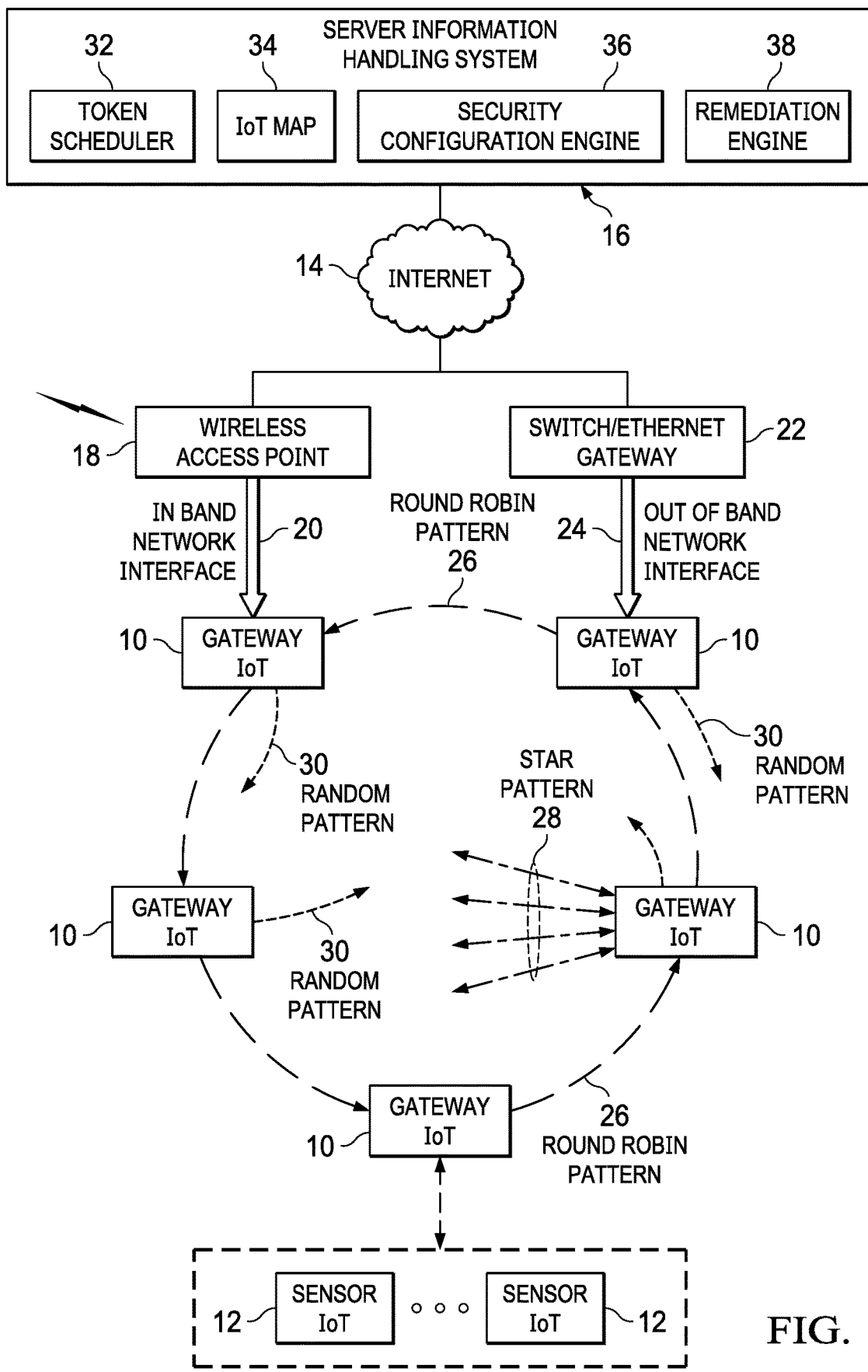
FIG. 1 depicts a block diagram of IoT devices deployed to collect and report information while autonomously detecting, isolating and remediating threats.

Referring now to FIG. 1, a block diagram depicts IoT devices 10 and 12 deployed to collect and report information while autonomously detecting, isolating and remediating threats. In the example embodiment, plural gateway IoT devices 10 interface through wireless communications, such as a wireless local area network (WLAN) using 802.11(b, g, n or ad), and report information gathered from plural sensor IoT devices 12 through Internet 14 to a server information handling system 16. Generally IoT devices as used herein, such as IoT gateways 10 and IoT sensors 12, are a subset of information handling systems that operate autonomously through networked communications. IoT devices include processing resources, embedded code, software, sensors and/or actuators that use network connectivity to exchange information. IoT devices are uniquely identifiable and equipped to interoperate within existing Internet infrastructure. Low cost and low power IoT devices offer integration of the physical world into the information world to improve the operation of physical devices without human intervention. For example, IoT devices are headless devices that do not include graphics to support a display or input devices to directly input information or commands to a processor. Rather, IoT devices interact through networked communications that send information to information handling systems for human consumption. By focusing IoT device capabilities narrowly to tasks suitable for autonomous processing, the cost, capabilities and power consumption of IoT devices is reduced, as are maintenance requirements associated with deployed IoT devices. Further, by leveraging existing Internet infrastructure, standardized designs of IoT devices readily fit into a wide variety of tasks with embedded code managing desired tasks. However, these characteristics of IoT devices tend to make conventional information handling system security measures unsuitable, such as firewalls and anti-malware software.

In order to manage threats to IoT devices, the present disclosure architects an unattended IoT solution that does not attempt to prevent malicious attacks, but rather attempts to minimize and contain exposure to malicious attacks through autonomous and/or peer recognition of an attack vector within a population of IoT devices, such as a DDoS, Portsweep, Spoofing, Man-in-the-Middle or other types of attacks. IoT device nodes create spatial, temporal and environmental awareness through behavioral mapping of related factors for each IoT node. For example, location based awareness may include a physical location defined by GPS or a WiFi hotspot within wireless range, a cluster of other IoT devices within wireless range, regional indications associated with network packets, etc. . . . . Temporal based awareness includes the time from a last update by a local IoT device, a time of a last network ping, timing between other wireless communications within range, etc. . . . . Environmental based awareness includes a time of day, a temperature that indicates season or indoor/outdoor location, network congestion etc. . . . . By reference to the spatial, temporal and environmental awareness, a population of plural IoT devices couple through exchange of a token based population metric from which each IoT device drives a decision synthesis for detecting threats and taking appropriate action. A single node or a collection of nodes acting in concert detect threats by communication failures associated with token transfer between the nodes, and then contain the attack to maintain functionality of the population dynamically and in real time with self and/or group adaptive and automated actions aided, in some instances by coordination through server information handling system 16.

In one example embodiment, plural IoT nodes self-organize as a selected of plural defined topologies to establish a token exchange schedule that references context to provide timed communication of a secure token value. For example, the token is determined as a simple expression derived from context or as a more complex hashed value that morphs with transfer signatures at transfer between IoT nodes. Threat detection is performed with a comparison of the token value and the timing of the token transfer relative to the schedule. An IoT device and its near-peers, meaning the IoT devices with which it exchanges the token, each review token exchanges to detect a threat where a token transfer includes an invalid value or a failure to transfer within a defined time window. Near-peer nodes may also be defined in terms of spatially or functionally adjacent nodes that initiate verification when failure of token transfer or other threat detection occurs. In the event that a token transfer failure is detected, near-peers alert the population of the threat to initiate additional threat analysis, threat quarantine and corrupt device remediation. The schedule for token exchange, including the size of the population associated with a token exchange, may vary based upon network traffic and suspicious patterns, such as high incident-repeated accesses within a time frame, insistent or out of normal port accesses, and population behavioral attributes like payload size and communication timeframes. Upon detection of a threat, near peers of the threat, near peers of a corrupted node initiate check session and listen for acknowledgment to confirm node failure, and then perform containment and reassignment that reconfigures available nodes to perform functions of the failed node. For instance, reconfiguration may be policy driven based upon predetermined mapping schemes or driven dynamically based on real time context including current load and risk assessments. In addition, near peers and/or a failed node itself may initiate remediation and protective measures for sensors interfaced with the failed node, such as with an out of band reimaging of the failed node.

In the example embodiment of FIG. 1, gateway IoT devices 10 establish a token exchange schedule in one of three available topologies. A round robin topology 26 sends a token to each gateway IoT 10 in turn and repeats the pattern over time. A star topology 28 uses one gateway IoT 10 as a central communication point that sends and receives the token from each member of the population on a schedule. A random topology 30 sends the token to each member in a random fashion referencing a schedule that each gateway IoT device 10 knows. With each topology, known token content and communication times allows each node in the population to detect a token communication failure, such as by invalid content or communication outside of an expected time window. The example embodiment depicts one gateway IoT 10 managing plural sensor IoT devices 12. A token exchange may be supported within this population in a manner similar to that described above for the gateway IoT population. If a sensor IoT 12 detects failure of its gateway IoT 10 or another sensor IoT 12 in its population due to failure of a token exchange, the sensor IoT 12 may report the failure to its assigned gateway IoT 10 or another of the gateway IoT devices. In an example embodiment that has multiple populations of gateway IoT devices 10 that exchange tokens on a schedule, an interrelationship between populations may be established by assigning one or more of the gateway IoT devices to multiple populations.

In the example embodiment of FIG. 1, an "in-band" network interface 20 is provided by WiFi through a wireless access point (WAP) 18 and an "out-of-band" network interface 24 is provided by a switch/Ethernet gateway 22. WAP 18 supports a wireless interface between gateway IoT devices 10, such as by defining a wireless local area network (WLAN) through which gateway IoT devices interface. In alternative embodiments, multiple WAPs 18 and other central nodes may define an intranet so that gateway IoTs 10 may establish communications with each other and server information handling system 16 through multiple network pathways. In the example embodiment, WAP 18 interfaces with server information handling system 16 through Internet 14, thus providing a wide attack vector through which malicious actors may introduce malicious code. WAP 18 provides in-band communication meaning a communication medium through which operational functions are performed. For example, each gateway IoT 10 gathers information from plural sensor IoT devices 12 and, in some instances, controls actions at sensor IoT devices 12. In some instances, sensor IoT devices 12 interface through a WLAN supported by WAP 18; in other instances, sensor IoT devices 12 communicate through low energy and short range wireless personal area networks (WPAN) to one or more gateway IoT devices 10, such as through Bluetooth or Bluetooth Low Energy interfaces. Switch/Ethernet gateway 22 offers a wired network pathway to server information handling system 16 as an alternative communication medium, such as to perform data transfers consolidated from other gateway IoT 10 and sensor IoT 12 devices and to perform maintenance at the interfaced device. In various embodiments, some, none or all of the gateway IoT devices 10 include an out-of-band communication medium. In alternative embodiments, the out-of-band medium may include other types of interfaces, such as a wireless wide area network (WWAN) supported by a wireless telephone provider, a telephony or cable modem, or other type of Internet interface.

Server information handling system 16 is, for example, a virtual machine located in a cloud architecture that manages information provided from IoT devices communicating through Internet 14. In the example embodiment, a security configuration engine 36 executing on server information handling system 16 applies an IoT map to define token content and transfer times between the gateway IoT devices 10. A token scheduler 32 manages communication of the token schedule to the IoT gateway devices 10, or, alternatively, receives token transfer schedules generated by the IoT gateway devices 10 locally. A remediation engine 38 includes images for gateway IoT devices 10 and sensor IoT devices 12 and executable code to transfer the images to IoT devices with an out-of-band network communication. Although server information handling system 10 offers a centralized platform to coordinate token transfer schedules, in one embodiment token transfer schedules are determined locally through coordination of gateway IoT devices 10 and then communicated to server information handling system 16 for validation. In such a system, gateway IoT devices 10 implement the threat detection, isolation and remediation described herein in an autonomous manner.

Figure 2:
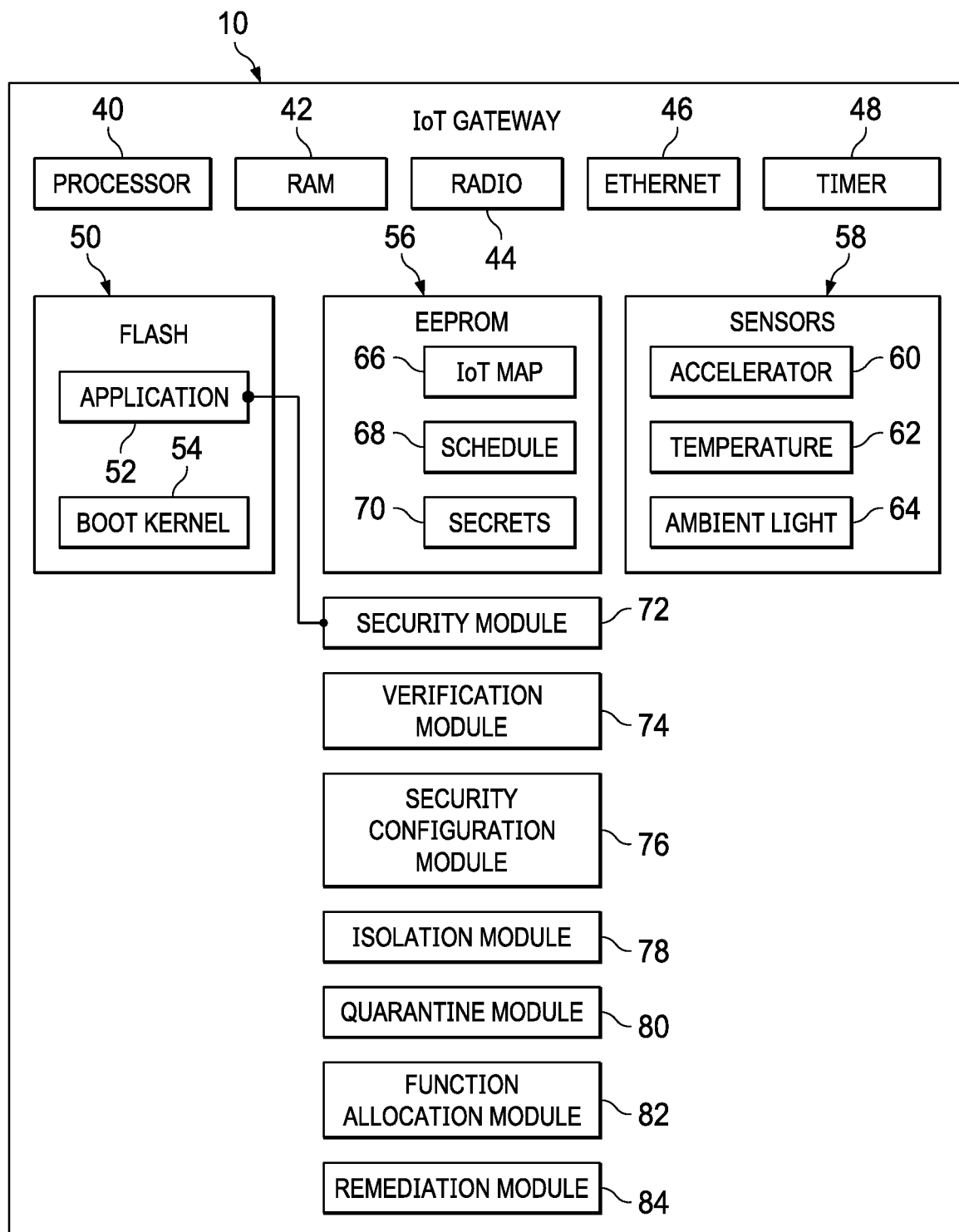
FIG. 2 depicts a block diagram of an exemplary gateway IoT device configured for autonomous threat detection.

Referring now to FIG. 2, a block diagram depicts an example of a gateway IoT device configured for autonomous threat detection. Gateway IoT device includes a processor 40 that executes instructions store in random access memory (RAM) 42 to process information, such as for communication with external devices through a radio 44 or Ethernet connection 46. As an example, processor 40, RAM 42 and flash memory 50 are configured as a system on a chip that executes an application 52 stored in persistent flash memory 50. A boot kernel 54 stored in flash memory 50 is retrieved to RAM 42 for execution by processor 40 on initial start. Boot kernel 54 initiates application 52 if available and, if not, places processor 40 in a wait state to accept an application download, such as through radio 44 or Ethernet 46. In various embodiments, radio 44 supports wireless signal communication through WiFi with 802.11(b, g, n, ad), through Bluetooth or through wireless network service providers. A timer 48 runs in background from a crystal time reference to execute code at periodic intervals. For example, timer 48 acts as a watchdog that monitors responsiveness of processor 40 and prevents hangs by application 52, such as by restarting or resetting processor 40.

In the example embodiment, IoT gateway 10 includes an EEPROM or other writable persistent memory to store information during power down of RAM 42. For instance, an IoT map 66 stored in EEPROM 56 tracks IoT devices of interest to application 52, such as sensor IoT devices monitored by application 52 and other gateway IoT devices in range. A schedule 68 stored in EEPROM 56 stores expected token communication times for gateway IoT devices 10 associated in a community with the depicted gateway IoT device. Secrets 70 include the basis for generating a token with a secure value included. Secrets 70 may include a private key established at manufacture or deployment of the device, an algorithm or hash key that can generate a secure value, or other type of value that enables a secure token values identifiable by other gateway IoT devices in the token exchange community. In one example embodiment, EEPROM 56 is encrypted so that malicious code executing on processor 40 cannot access IoT map 66, schedule 68 or secrets 70 to mimic an authorized gateway IoT of a population defined by schedule 68.

In the example embodiment, gateway IoT 10 includes sensors 58 that detect environmental conditions. For example, an accelerometer 60 detects accelerations, such as vibrations or movement of gateway IoT 10. A temperature sensor detects a temperature at gateway IoT device 10. An ambient light sensor detects ambient light at gateway IoT device 10. In various alternative embodiments, sensors 58 interfaced with processor 40 may detect current, voltage, magnetic fields, GPS locations or other types of environmental conditions of interest. In many instances, a gateway IoT device 10 includes the sensors 58 of sensor IoT devices 12 and performs both sensor and gateway functionalities. Thus, the example embodiment depicts an example of a sensor IoT device hardware configuration. In some instances, a gateway IoT device 10 acts as a central Bluetooth Low Energy server that accepts information from sensor IoT devices 12 and forwards the information on to a cloud storage location. In various embodiments, sensor IoT devices 12 may interface with one or multiple gateway IoT devices 10 that are distributed in proximity, such as within Bluetooth or WiFi range.

In the example embodiment of FIG. 2, various embedded code modules are depicted that execute on processor 40 as part of application 52. A security module 72 sends a token to one or more of the plural IoT devices of its population at predetermined time windows as defined by schedule 68. Communication of a token with expected content in an expected time window provides a security reference between a sending and a receiving IoT node that each IoT node is running uncorrupted code. For example, a watchdog within timer 48 initiates communication of a token based upon schedule 68, confirms that code to send the token executed and provided a correct response, and determines that an expected token was reported within a scheduled time window. In one embodiment, timer 48 executes as separate kernel or thread independent of application 52 so that a failure of application 52 to handle a token communication, such as sending a token or receiving a token from a near peer, indicates corruption in the IoT device. A verification module 74 interfaces with security module 72 receives tokens from one or more of plural IoT devices in schedule 68, stores a received time for each received token, and compares each received token's content and received time with expected content and expected receive time to validate the token. Verification module 74 reports token receive times for tokens with valid content to timer 48 so that timer 48 does not indicate a token transfer failure. If verification module 74 fails to report a valid token receive time within an expected scheduled time window, timer 48 will indicate a failure. As set forth in greater detail below, cooperation of security module 72 and verification module 74 through timer 48 provides a temporal and context reference that indicates proper operation or corruption of application 52. Once a failure is confirmed, timer 48 may autonomously initiate corrective action associated with its device or a near peer device.

Security configuration module 76 schedules IoT devices as targets for the security module 72 to send one or more tokens at one or more times, such as at periodic time intervals. Security configuration module 76 also schedules verification module 74 to receive one or more tokens from one or more of the IoT devices of a population at one or more expected receive times. Security module 76 stores the scheduled token send and receive times in schedule 68 as a reference from which timer 48 checks to ensure code on gateway IoT 10 remains uncorrupted. In one embodiment, each security configuration module 76 of a defined population of IoT devices autonomously communicates within the population to establish schedule 68. For instance, each gateway IoT device 10 searches for other IoT devices within wireless communication range to locate a predefined number for inclusion with a security population. Once a population is defined, a schedule 68 is coordinated and stored in EEPROM 56 of each IoT device in the population so that each IoT device may verify that each population member remains uncorrupted by malicious code. In one embodiment, schedule 68 is communicated to server information handling system 16 for validation before implementation in the population. Alternatively, server information handling system 16 may provide a schedule to each member of a population that each member verifies with wireless communication before implementation. In one embodiment, schedule 68 includes only gateway IoT devices that have both in-band and out-of-band communication mediums. In an alternative embodiment, sensor IoT devices 12 may be included in a population.

Isolation module 78 interfaces with security module 72 and verification module 74 to disable communications at an in-band network interface from one or more of a population of plural IoT devices if a token associated with the IoT device has invalid content or is communicated outside of a valid time period as defined by schedule 68. Isolation module 78 helps to prevent spread of malicious code and related actions by having operational IoT devices disregard communications from IoT devices that fail to maintain continuity of a token through a population according to a defined schedule. For example, in a round robin topology a failed IoT device is detected by a near peer when the failed IoT device receives a token with an invalid value or outside of a scheduled time period. The near peer (or both near peers) broadcasts a threat alert having an identifier of the failed IoT device so that other population members associated with the near peer may isolate the failed device by disregarding communications from the failed device. In an alternative embodiment, the near peer includes the failed device identifier as part of the token so that other IoT devices in the population receive the alert in a secure manner. In another alternative embodiment, the near peer sends the alert through server information handling system 16 using the out-of-band network interface so that server information handling system 16 provides the alert to all relevant IoT devices. In addition, isolation module 78 may include logic to perform self-isolation of gateway IoT 10 if security module 72 fails to send a token as defined by schedule 68. For instance, a portion of isolation module 78 executes in conjunction with timer 48 as a watchdog that checks for successful communication of a token according to schedule 68. Failure to send a token, such as may be indicated by failure to set a flag read from timer 48, may result from corruption of application 52 or incomplete communication indicated by the radio, such as in a Bluetooth or similar device stack. Isolation module 78 analyzes the token communication failure to determine if the failure is associated with a near peer device receiving the token or with gateway IoT 10 and takes corrective isolation actions accordingly.

Quarantine module 80 define a quarantine schedule for token transfers between the IoT devices that excludes a failed IoT device associated with an invalidated token or token communication time. For example, once a failed device is identified in a population, quarantine module 80 establishes a quarantine schedule for token transfers that excludes an isolated IoT device. The quarantine schedule allows token communications to continue within the population until the failed device is remediated or replaced. For example, quarantine module 80 establishes communication between the near peer that sent a token to the failed IoT device and the near peer that received the token from the failed IoT device, and defines token communication directly between the near peers to bypass the failed IoT device. In one embodiment, quarantine is self-initiated within the quarantine modules 80 of the near peers, such as by isolating from the token schedule all population devices that fail to respond to a check. Alternatively, quarantine may be coordinated through server information handling system 16. A cross check between each near peer provides the identity of the failed device based on failure to respond to the cross check. In various embodiments, near peers communicate with each other to confirm the failed device or share the results of token and cross check communications with server information handling system 16 to confirm the failed device. In one example embodiment, a cross check between near peers may include stored communication times and tokens of each near peer with the failed device so that each near peer can independently verify the device failure. In another example embodiment, sensor IoT devices 12 may interface with near peers of the failed device to further confirm the failure. For instance, if attempts to communicate sensor information to a gateway IoT node, the sensor IoT node may autonomously establish an interface with a near peer to report the failure and initiate a threat detection logic, such as a cross check of token communication information between the near peers and the failed device.

Functional allocation module 82 queries near nodes of a failed IoT device for predetermined attributes and applies the predetermined attributes to assign one or more functions of the failed IoT device to one or more of the plural near nodes. Once a failed IoT device is detected by failure of a token transfer, functions of the failed device are transferred to other IoT devices in the community, or, alternatively, the community is adjusted to include additional IoT devices that can accept the failed device functions. In one embodiment, IoT map 66 includes a list of functions assigned to near peer IoT devices so that allocation of functions may be performed autonomously by near peers of a failed IoT device. Alternatively, function allocations may be managed by server information handling system 16. Reallocation of functions may be driven by a variety of factors determined from attributes retrieved from the population of IoT devices. For example, the load experienced by nodes of the population indicates the processing ability to accept additional functions, such as the number of sensors assigned to a node. As another example the wireless range and available bandwidth between nodes of the population and devices associated with functions may be considered when reassigning devices and functions to the nodes of the population.

Remediation module 84 identifies a failed IoT device in a community and initiates a re-image of executable code on the failed IoT device to bring the IoT device back into operation. Remediation may be performed locally by a device that self-detects corruption, remotely by a server information handling system through an out-of-band interface, or remotely through an in-band interface, such as by a near peer within the failed device's token exchange population as defined by schedule 68. As an example, upon detection of failure of an IoT device, a near peer of the failed IoT device communicates a remediation request for remediation of the failed IoT device to the failed IoT device through in-band communication or, alternatively, to a server information handling system 16 through out-of-band communication. In one example embodiment, if IoT device 10 detects a failure of itself in the communication of a token, timer 48 may set a value in EEPROM 56 that boot kernel 54 reads on restart and then initiate a restart to place processor 40 into a boot state that accepts a re-imaging through a secure transfer. Once a failed device is in a boot state, a near peer or other device within range may re-image the failed device to bring it back to an operational state. Alternatively, a near peer communicates failure of a device to server information handling system 16 so that an out of band communication may reset the failed device to a boot state and initiate a re-image. For instance, an Ethernet communication may directly initiate remediation with secure logic interfaced with processor 40, such as a microcontroller or protected portion of embedded code tied to a GPIO. If the near peer that detected failure is a sensor IoT device that does not have a direct Internet interface, the failure may be communicated to or through a gateway IoT device. In one embodiment, once a failed gateway IoT device is remediated to an operational state, it may in turn perform remediation of sensor IoT devices assigned to it, such as with a wireless command, in order to ensure that the sensors do not have corrupted code. In the flow diagrams described in greater detail below, various embodiments are presented that identify, isolate, quarantine and remediate corrupted IoT devices in an autonomous manner.

Figure 3:
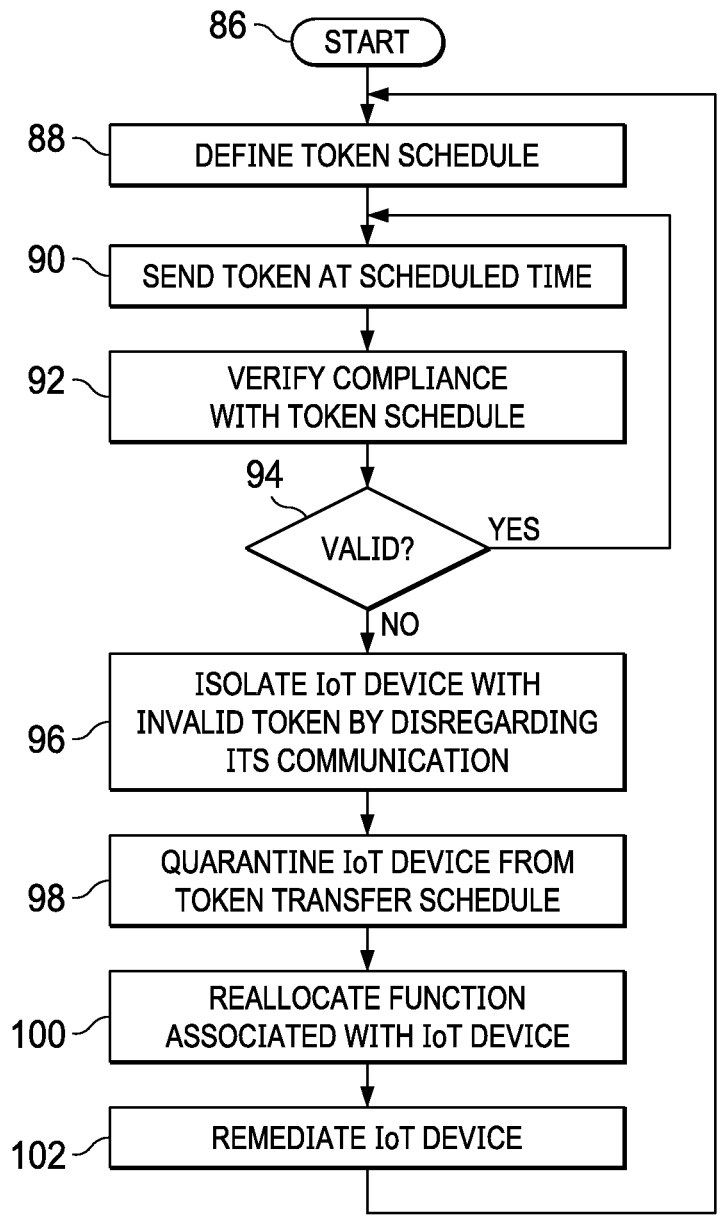
FIG. 3 depicts a flow diagram of a process for autonomously managing deployed IoT device security.

Referring now to FIG. 3, a flow diagram depicts a process for autonomously managing deployed IoT device security. The process starts at step 86 with application of power to an IoT device and continues to step 88 to define a token schedule for communicating the token with other IoT devices before interaction with a network. A step 90, the token is sent at a scheduled time with application code so that near peers of the token can confirm correct operation of the IoT device by monitoring token communication. At step 92, compliance with a token communication schedule is verified, such as by ensuring that the application sends the token at scheduled times and receives tokens from near peers at scheduled times. At step 94, a check is made to determine if all token communications are normal and, if so, the process returns to step 88 to continue monitoring token communications. As set forth above, monitoring of an application and its token communications is performed both internally within a device and externally by near peer devices. A watchdog or other timer in a secure kernel, thread or controller, provides scheduled checks of token communication status as a check for execution of an application on an IoT device in an uncorrupted manner.

If at step 94 the token communication is not valid, then the process continues to step 96 to isolate the IoT device with the invalid token communication by disregarding communications from the corrupted IoT device. In one embodiment, isolation is initiated by detection at an IoT of a near peer failed device. In an alternative embodiment, isolation is initiated based upon an alert issued by an IoT device in a population that detects a failed device as a near peer. At step 98, quarantine of the IoT device is initiated to establish a quarantine token exchange schedule that provides token transfer excluding the corrupted the IoT device. At step 100, functions of the failed IoT device are re-allocated to other devices, such as near peers of the failed IoT device. Finally at step 102 a remediation of the failed IoT device is attempted, such as through an in band or out of band communication.

Figure 4:
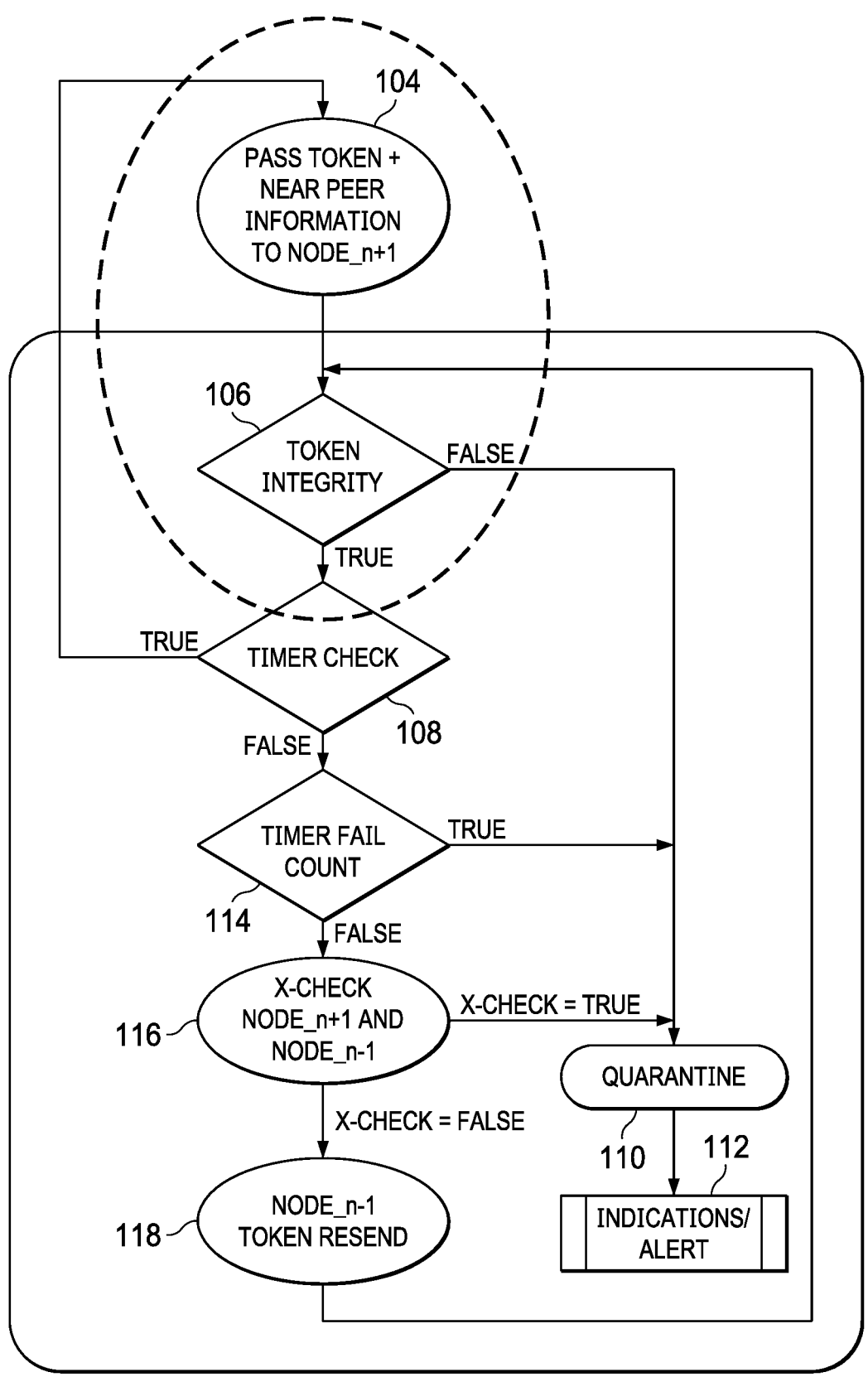
FIG. 4 depicts a flow diagram of a process for threat detection at a self-effecting IoT device.

Referring now to FIG. 4, a flow diagram depicts a process for threat detection at a self-effecting IoT device. The process starts at step 104 with plural IoT devices disposed in topology, such as a round robin topology, to exchange tokens that monitor the IoT device population health. For example, tokens exchanged by IoT devices may include simple or complex values generated from a hash derived from population context. Token values may be modified on every transfer, such as with changing population context based upon node mapping or a transfer algorithm based upon transfer sequence. Each IoT device that receives a token may check a secrets integrity based upon shared context and/or a private key. At step 104 a token passes with the IoT device's information to a near peer node of the population labeled n+1. At step 106, the near node checks the token integrity, such as by comparing a received token value with an expected value, and if the token is valid proceeds to step 108 to check that the token communicated within a valid time window. If the token value and time are both valid, the process returns to step 104 to continue monitoring the IoT device's health. If the token value is not valid, the process continues to step 110 to quarantine the failed IoT device that sent the invalid token value. Similarly, if the time period of the token communication is not valid, the process continues to step 114 to check a timer fail count and, if the count exceeds a threshold, to step 110 to quarantine the failed device. At step 112, an alert that identifies the failed IoT device is issued. At step 114, if the determination is that the timer has not made a defined number of attempts to communicate the token, the process continues to step 116 to perform a cross check inquiry with the near nodes before and after the present node in the token transfer order, identified as Node N−1 and Node N+1. If the cross check confirms a node failure, the process continues to step 110 to quarantine the failed node. Otherwise the process returns to step 106 to attempt another token communication.

Figure 5:
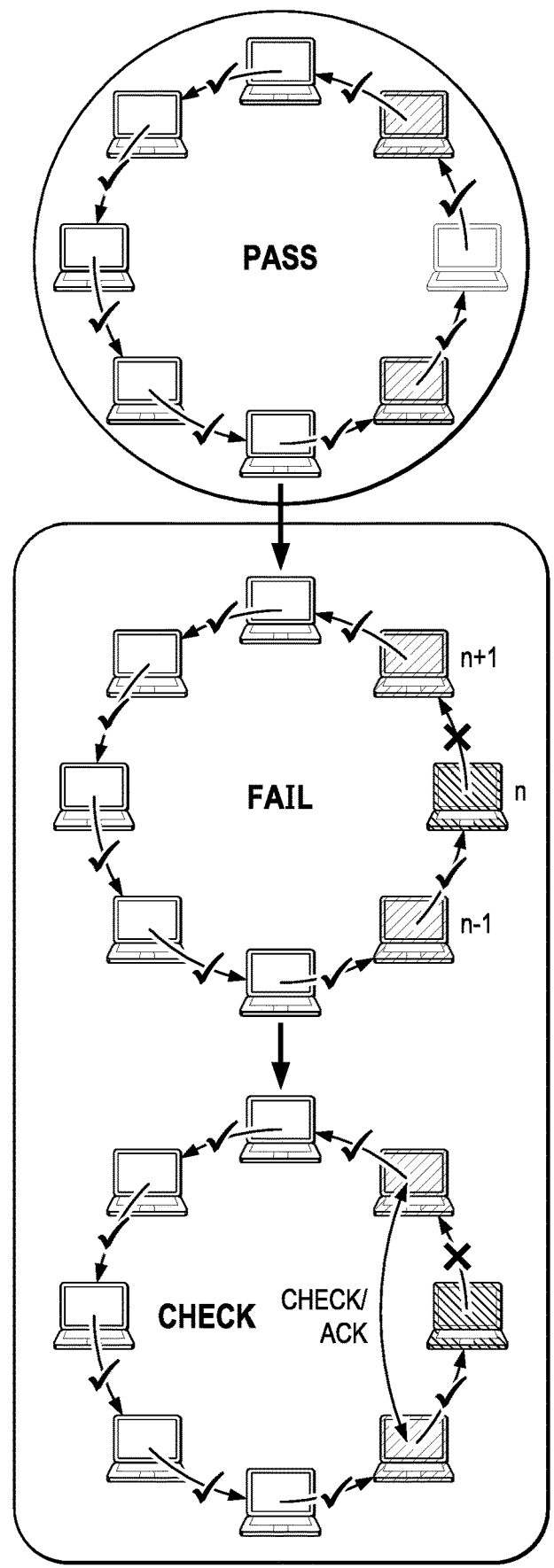
FIG. 5 depicts an example block diagram of threat detection, isolation and quarantine in a population of autonomous IoT devices.

Referring now to FIG. 5, an example block diagram depicts threat detection, isolation and quarantine in a population of autonomous IoT devices. In the example embodiment, a token is passed in a round robin topology with each IoT device confirming the token's value and communication time. The failed IoT device, shown as shaded, is identified as failed based upon token communication. For example, failure of node N−1 to successfully communicate a token, such as may be indicated by the radio stack, may indicate a fault. As another example, failure of node N+1 to successfully receive a token in a scheduled time window may indicate a fault. As another example the faulty node may detect its own fault by its failure to receive a token from node N−1 or to send a token to node N+1. In the example embodiment, the faulty node is quarantined by maintaining the round robin topology and scheduling node N−1 to communicate with node N+1 and skipping the failed node. For instance, near nodes N−1 and N+1 initiate a threat detection session to autonomously isolate the failed node by confirming that the token communication failed at the failed node. In various embodiments, near nodes may take additional analytical steps to identify the type of threat based upon the token parameters and the population spatial, temporal and environmental factors.

Figure 6:
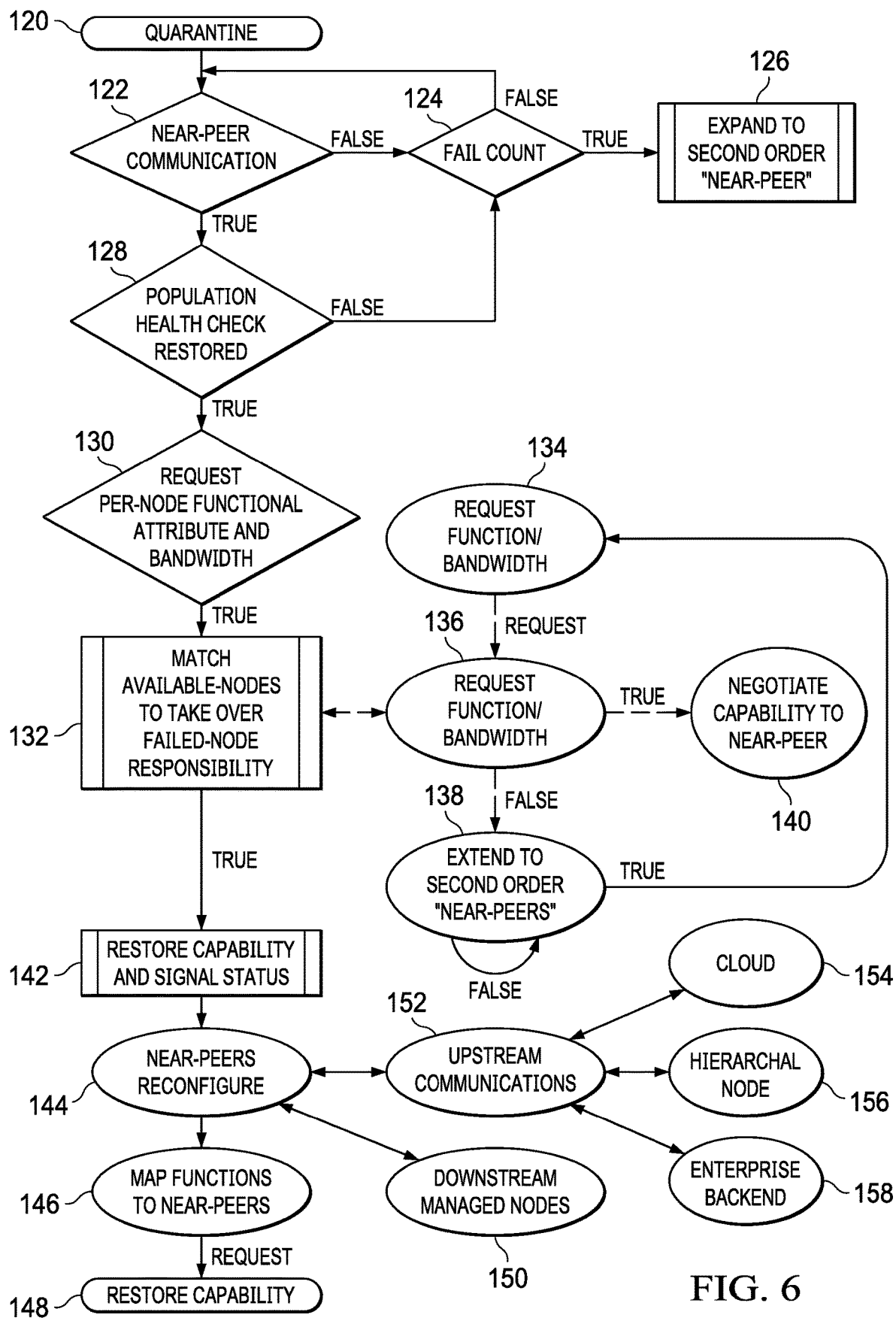
FIG. 6 depicts a flow diagram of a process for managing an IoT device associated with a threat detection, such as malicious code detected by failure of a token communication.

Referring now to FIG. 6, a flow diagram depicts a process for managing an IoT device associated with a threat detection, such as malicious code detected by failure of a token communication. The process starts at step 120 with quarantine of an IoT device due to a detected threat. Upon entry of a failed node into quarantine, near peers of the failed node autonomously attempt to arrest the effects of the failure by establishing a continuity for token propagation that effectively establishes a path around the affected node. At step 122, near nodes attempt to establish communication by reference to the token communication schedule. If a communication with a first order of near nodes fails, the near nodes attempt additional communications at step 124 and, after a defined number of failed attempts proceed to step 126 to attempt to establish communications with a second order of near nodes. If at step 122 near node communication is successful, the process continues to step 128 ensure that a successful token communication is supported in the population. If not, the process returns to step 122 to reattempt near peer communication. Once a successful quarantine is established and token communication has begun, the process continues to step 130 to request functional attributes and bandwidth associated with nodes in the population. The attributes and available bandwidth allow an analysis of available resources that can take over functions performed by the failed node. The analysis starts at step 132 to identify candidates that can accept functions and continues to step 136 to request functional availability and bandwidth for each identified node. The attribute request is made at step 134, resulting in a failure to contact the node so that the logic extends to the next near node at step 138 or a successful communication resulting in negotiation of functionality capabilities at step 140. In one embodiment, the analysis of available resources and selection of replacement nodes is performed autonomously by a node within the population. Alternatively, the analysis and selection may be coordinated in part by a remote server information handling system 16.

Once a determination of available functionality to replace a failed node is complete at step 132, the process continues to step 142 to restore the functionality of the failed node with available resources. At step 144, each selected near node reconfigures to perform newly assigned functions. At step 152, the reconfigured nodes communicate the new functionality assignments to cloud locations 154, hierarchical nodes 156 and/or enterprise backend systems as appropriate. At step 150, reconfigured nodes report updated functionality to downstream nodes as appropriate. At step 146, functions are mapped in the replacement nodes and, at step 148 functionality is restored based upon the new node assignments.

Figure 7:
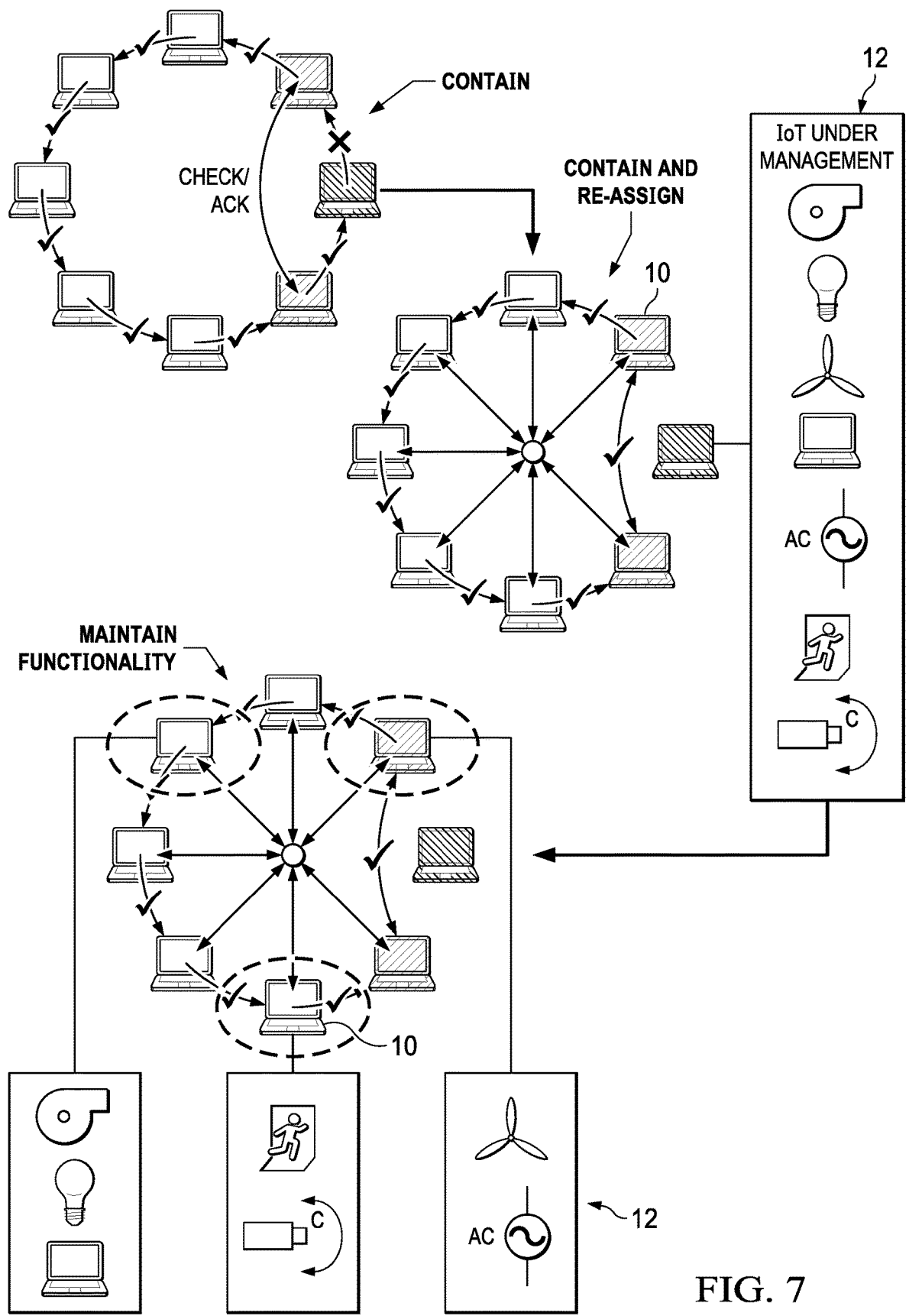
FIG. 7 depicts an example block diagram of reassignment of an IoT device's functions to other IoT devices in a population.

Referring now to FIG. 7, a block diagram depicts an example of reassignment of an IoT device's functions to other IoT devices in a population. The IoT device population has a shaded node in quarantine so that functions performed by the node may be identified and reassigned. In the example embodiment, the failed node is a gateway IoT device that has six sensor IoT nodes assigned to it, such as to monitor and/or control a camera, a light switch and a room thermometer. Once the failed IoT device is isolated and quarantined from in band network communications, sensor IoT devices 12 lack support for their functionalities. In response, the operational gateway IoT devices 10 cooperate to reassign two sensor IoT devices 12 to each of three operational gateway IoT devices 10, such as based on the range between the gateway and sensor IoT devices, the available bandwidth or other attributes discovered during the function reassignment process set forth in FIG. 6. The failed IoT device 10 remains isolated awaiting remediation, such as waiting in a boot state entered as a self-corrective measure upon detection of token exchange failure. In one alternative embodiment, after quarantine and before remediation, the image of the failed IoT device is copied and sent through the out of band network interface to server information handling system 16 for analysis of the malicious code. Based on such analysis, predefined failure modes may be set as defaults for future failure events.

Figure 8:
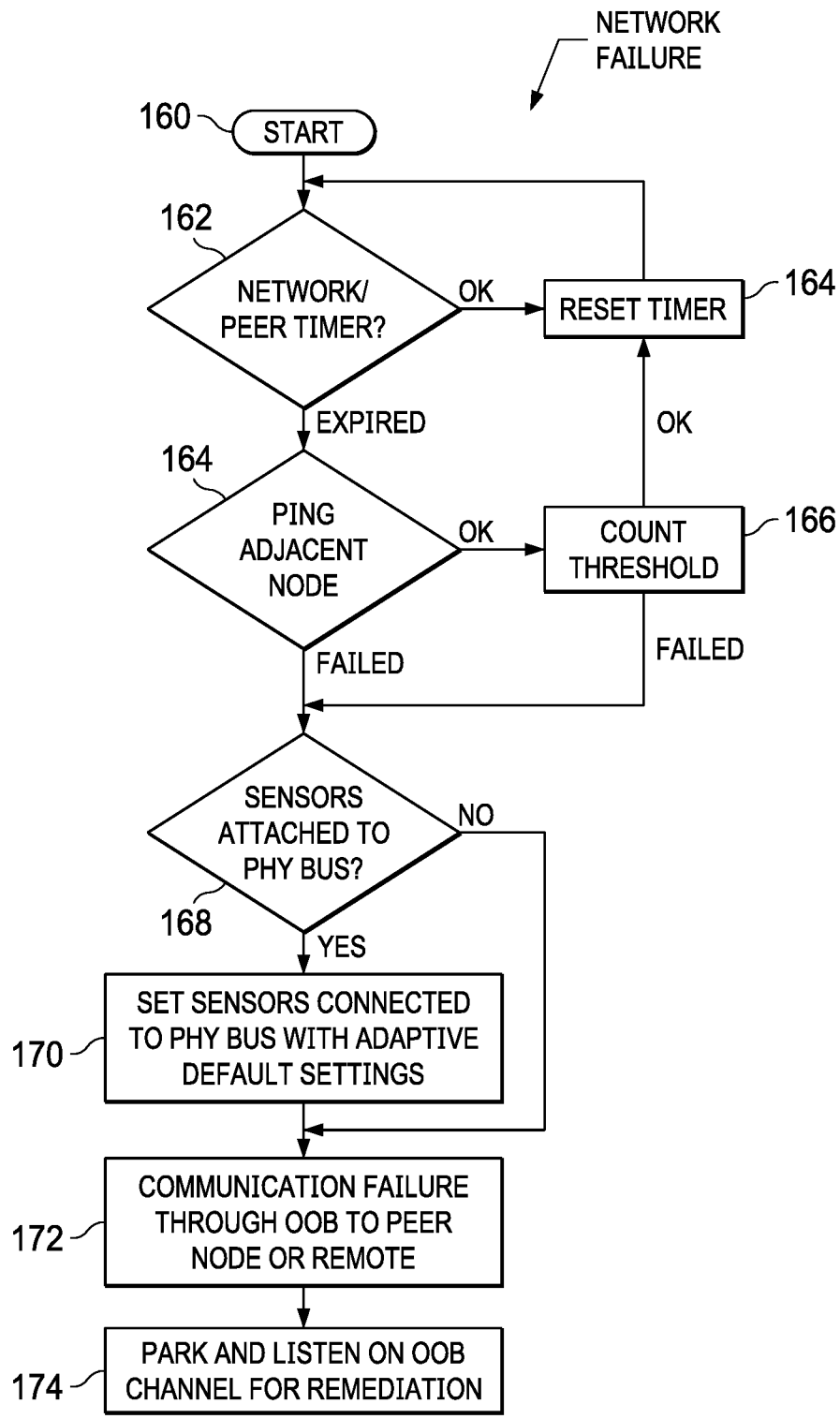
FIG. 8 depicts a flow diagram of a process for out of band remediation of a failed IoT node detected by network communication.

Referring now to FIG. 8, a flow diagram depicts a process for out of band remediation of a failed IoT node detected by network communication. The process starts at step 160 with monitoring of an IoT device. At step 162, a network token exchange and peer timer are compared against a token exchange schedule to detect threats as described above. If the token exchange is valid, the process resets the timer at step 164 and returns to step 162 to continue monitoring. If the timer expires without a valid token exchange, the process continues to step 164 to check near nodes for operational communication. At step 166, a comparison is made of the number of checks made on adjacent nodes against a threshold. If the threshold is not met, the process returns to step 164 to continue with monitoring. If the count threshold is met at step 166 or if the attempt to check in with adjacent near nodes fails at step 164, the process continues to step 168 to determine if sensors are interfaced to the device through a physical bus. If so, the process continues to step 170 to set the sensors connected to the physical bus with adaptive default settings, such as sensor settings enforced in the event of network failure. At step 172, communication of the failure at the in band network interface is made through an out of band network interface to a peer node or remote network location. At step 174, the IoT device parks and listens on an out of band channel for remediation, such as a re-imaging of the application.

Figure 9:
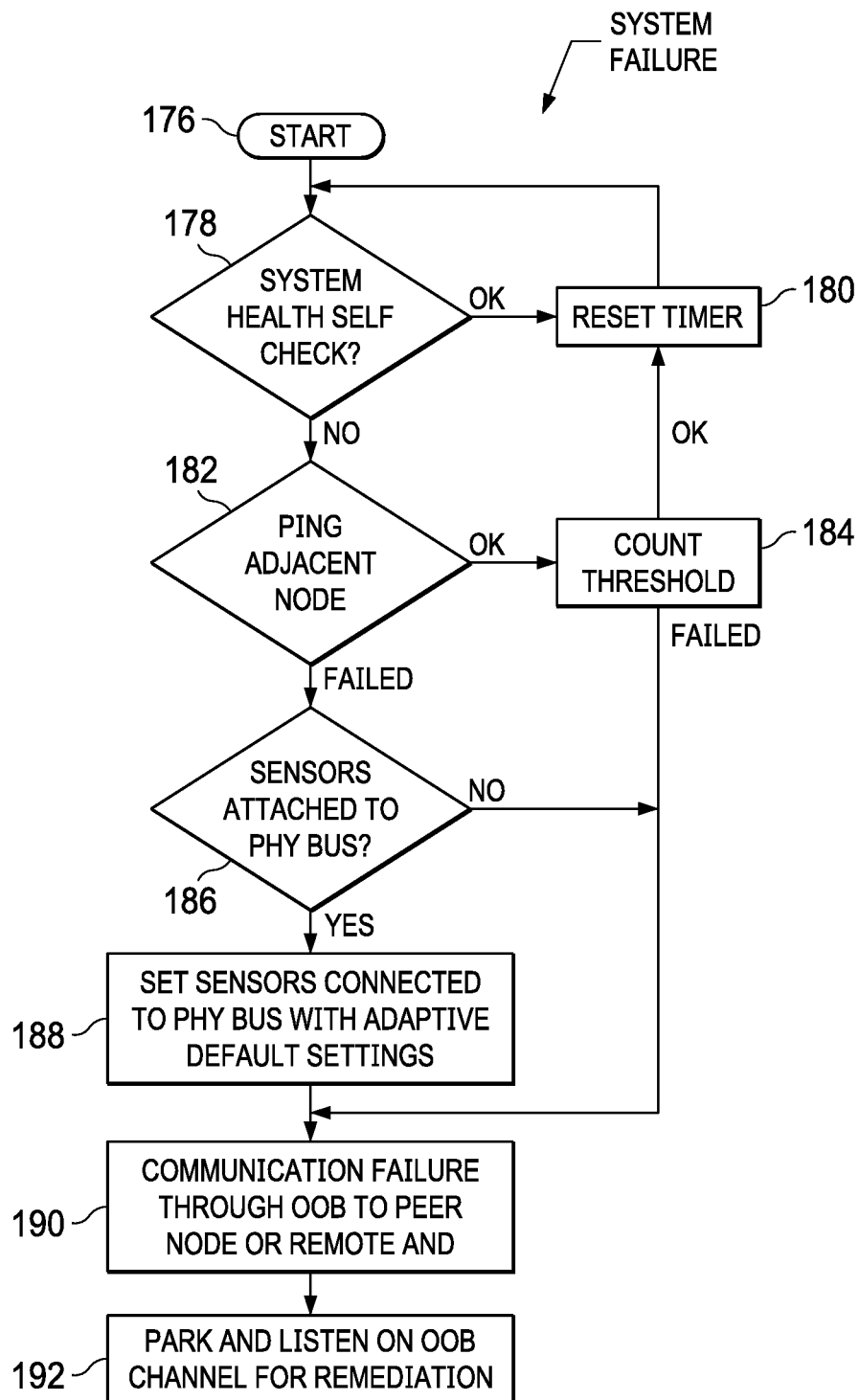
FIG. 9 depicts a flow diagram of a process for out of band remediation of a failed IoT node detected by the failed node.

Referring now to FIG. 9, a flow diagram depicts a process for out of band remediation of a failed IoT node detected by the failed node. The process starts at step 176 with monitoring of an IoT device. At step 178, the device performs a self-check to detect failures, such as failure of a token exchange to send a token to a near peer device within a defined time window. If the self-check is valid, the process resets the timer at step 180 and returns to step 178 to continue monitoring. If the timer expires without a valid self-check, the process continues to step 182 to check near nodes for operational communication. At step 184, a comparison is made of the number of checks made on adjacent nodes against a threshold. If the threshold is not met, the process returns to step 180 to continue with monitoring. If the count threshold is met at step 184 or if the attempt to check in with adjacent near nodes fails at step 182, the process continues to step 186 to determine if sensors are interfaced to the device through a physical bus. If so, the process continues to step 188 to set the sensors connected to the physical bus with adaptive default settings, such as sensor settings enforced in the event of network failure. Once the sensors are set to default, the process continues to step 190 to communication the failure of the device out of band to a near peer or remote network location. At step 184, if the threshold count is met, the process also continues to step 190 to communicate the failure. From step 190, the process continues to step 192 to park and listen on the out of band channel for remediation.

Figure 10:
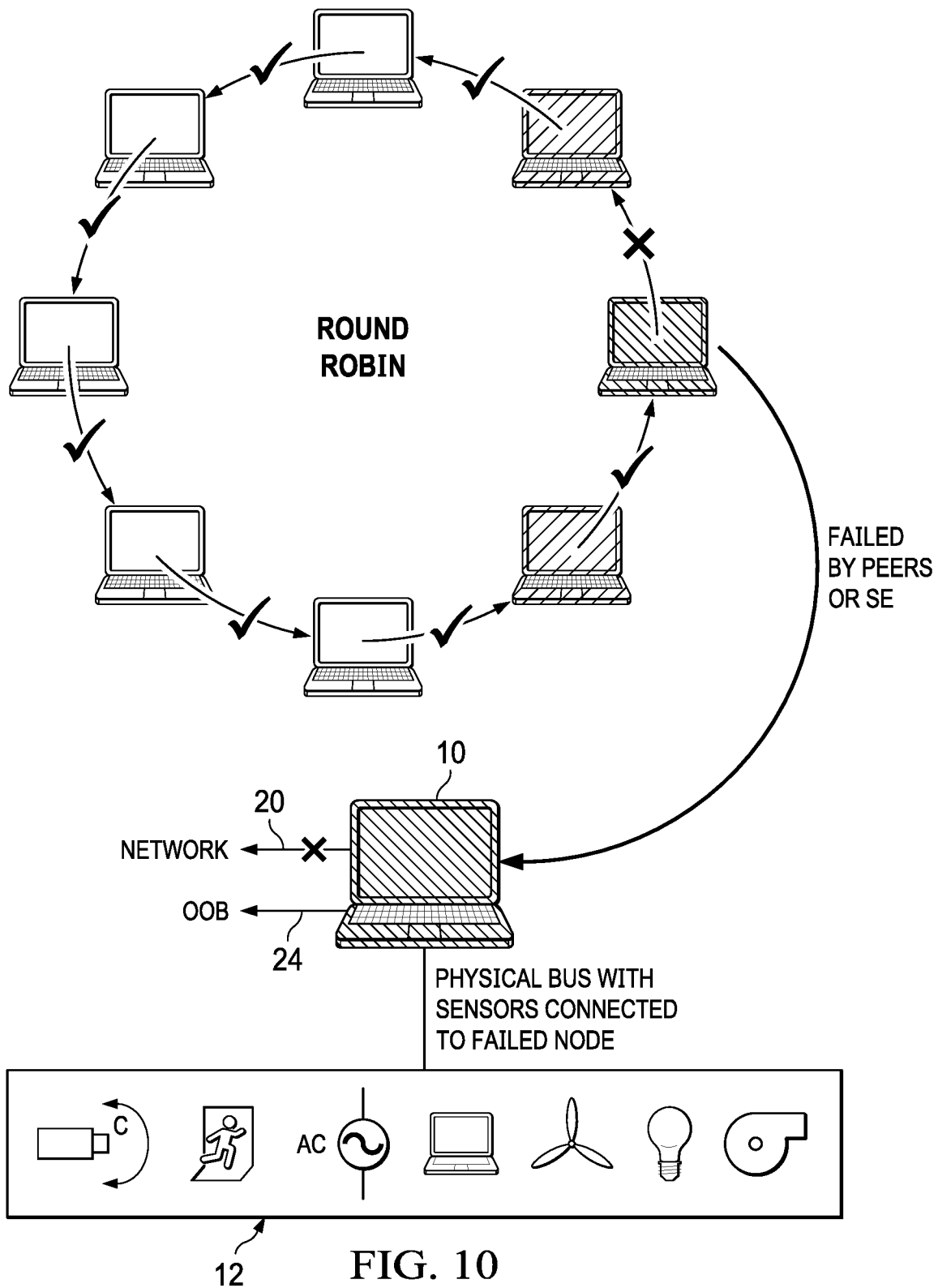
FIG. 10 depicts a block diagram of a failed node configured for out of band remediation.

Referring now to FIG. 10, a block diagram depicts a failed node configured for out of band remediation. In the example embodiment, the failed gateway IoT node 10 has plural sensor IoT devices 12 interfaced with a physical bus, such as a USB cable or Ethernet interface. Upon detection of the fault at gateway IoT 10, sensor IoT devices 12 are placed in a default setting that is operationally consistent with detection of a failed supporting gateway node. For example, a thermostat is set at a default temperature, lights are set at default brightness, alarms are set on, etc. . . . . The failed node has in band network interface 20 disabled to prevent interference by malicious or faulty application code with near peers and out of band network interface 24 is parked to listen for re-imaging of the application, such as from a trusted network location.

Although the present invention has been described in detail, it should be understood that various changes, substitutions and alterations can be made hereto without departing from the spirit and scope of the invention as defined by the appended claims.

What is claimed is:

1. A method for securing plural IoT gateways interfaced with a network, the method comprising:
communicating information with wireless signals from each of plural IoT sensors to at least one of plural IoT gateways within a plurality of network topologies;
communicating information with wireless signals between the plural IoT gateways, the plural IoT gateways forming a security population of IoT gateways having at least a first IoT gateway, a second IoT gateway and a third IoT gateway;
storing an order for passing a token among the security population of plural IoT gateways or plural IoT sensors in non-transitory memory of each of the plural IoT gateways or plural IoT sensors of the security population;
storing a schedule for passing a token among the security population of the plurality of IoT gateways or plural IoT sensors in non-transitory memory of each of the plural IoT gateways or plural IoT sensors of the security population, the schedule including at least a first time to pass the token from the first IoT gateway to the second IoT gateway and a second time to pass the token from the second IoT gateway to a third IoT gateway;
monitoring at each of the plural IoT gateways or plural IoT sensors receipt of the token based upon the defined order and schedule; and
issuing a threat alert identifying the failed IoT gateway or IoT sensor from one of the plural IoT gateways or IoT sensors if the one of the plural IoT gateways or plural IoT sensors detects either an invalid token or a failure to receive a valid token at a scheduled time in the stored order;
wherein a cross check inquiry is performed to confirm failure before the failed IoT gateway or IoT sensor is quarantined.

2. The method of claim 1 further comprising:
monitoring port accesses at the plural IoT gateways; and
adjusting the schedule based upon the number and type of monitored port accesses.

3. The method of claim 1 further comprising:
adjusting a content of the token at each communication from each of the plural IoT gateways; and
verifying the content of the token at receipt of the token at each of the plural IoT gateways to determine the token as valid.

4. The method of claim 3 further comprising:
detecting a failure to receive a token at a scheduled time at one of the plural IoT gateways; and
in response to the detecting, adjusting content of the token to indicated the failure before communicating the token to another of the plural IoT gateways.

5. The method of claim 4 wherein the defining an order further comprises:
defining with logic at each of the plural IoT gateways at least first and second near-peers of each of the plural IoT gateways; and
coordinating at each of the plural IoT gateways to receive a token from at least one near-peer and to send a token to at least another of the near-peers.

* * * * *